(12) United States Patent
Kitagawa

(10) Patent No.: US 8,713,083 B2
(45) Date of Patent: Apr. 29, 2014

(54) DIGITAL FINE DELAY PROCESSING

(75) Inventor: Tsuyoshi Kitagawa, Tokyo (JP)

(73) Assignee: Tektronix International Sales GmbH, Rheinfall (CH)

( * ) Notice: Subject to any disclaimer, the term of this patent is extended or adjusted under 35 U.S.C. 154(b) by 1977 days.

(21) Appl. No.: 11/036,461

(22) Filed: Jan. 13, 2005

(65) Prior Publication Data
US 2005/0168366 A1    Aug. 4, 2005

(30) Foreign Application Priority Data

Jan. 30, 2004    (JP) .................................. 2004-024889

(51) Int. Cl.
G06F 17/17    (2006.01)

(52) U.S. Cl.
USPC ......................................................... 708/313

(58) Field of Classification Search
USPC .................. 708/290, 270–27, 300–323, 200; 348/184, 500
See application file for complete search history.

(56) References Cited

U.S. PATENT DOCUMENTS

| | | | |
|---|---|---|---|
| 3,665,171 A | | 5/1972 | Morrow |
| 4,124,820 A | | 11/1978 | Arnstein |
| 4,285,045 A | | 8/1981 | Tamori et al. |
| 4,553,156 A | * | 11/1985 | Douziech et al. ............. 348/638 |
| 4,603,301 A | | 7/1986 | Dukes et al. |
| 4,835,723 A | | 5/1989 | Hansen |
| 4,866,647 A | | 9/1989 | Farrow |
| 5,005,016 A | * | 4/1991 | Schmidt et al. ............... 341/142 |
| 5,303,046 A | * | 4/1994 | Masuda ........................ 348/500 |
| 5,367,542 A | * | 11/1994 | Guo .............................. 375/359 |
| 5,428,309 A | * | 6/1995 | Yamauchi et al. ............. 327/158 |
| 5,473,638 A | * | 12/1995 | Marchetto et al. ............ 708/290 |
| 5,489,903 A | * | 2/1996 | Wilson et al. ................. 708/313 |
| 5,721,505 A | | 2/1998 | Tsuchiya |
| 5,878,097 A | * | 3/1999 | Hase et al. .................... 375/371 |
| 5,892,694 A | * | 4/1999 | Ott ................................ 708/313 |
| 6,005,983 A | * | 12/1999 | Anderson et al. ............. 382/254 |
| 6,130,708 A | * | 10/2000 | Kitagawa et al. ............. 348/184 |
| 6,169,437 B1 | * | 1/2001 | Navarro et al. ............... 327/270 |
| 6,208,671 B1 | * | 3/2001 | Paulos et al. .................. 708/313 |
| 6,218,880 B1 | | 4/2001 | Relph |
| 6,222,409 B1 | | 4/2001 | Kieda et al. |
| 7,015,740 B1 | * | 3/2006 | Feinberg et al. .............. 327/270 |
| 2004/0203470 A1 | * | 10/2004 | Berliner et al. ............. 455/67.16 |

FOREIGN PATENT DOCUMENTS

| | | |
|---|---|---|
| EP | 0762646 A1 | 3/1997 |
| EP | 1265364 A1 | 12/2002 |
| EP | 0979463 B1 | 1/2003 |
| JP | 7-202657 | 5/1997 |
| WO | WO 03/025853 A2 | 3/2003 |

* cited by examiner

*Primary Examiner* — Tan V. Mai
(74) *Attorney, Agent, or Firm* — Francis I. Gray; Michael A. Nelson; Marger Johnson & McCollom PC

(57) ABSTRACT

Digital fine delay processing provides an accurate and continuous delay for an analog signal generated from source digital data. A digital processor generates processed digital data corresponding to a delayed analog signal having a desired delay relative to the analog signal represented by the source digital data. The processed digital data is directly derived from the source digital data by digital processing, and both digital data are processed by a reference clock, or by the same phase and cycle of the reference clock. The processed digital data is converted into a the delayed analog signal. Modifying coefficients in a convolution function performed by the digital processor changes the desired delay so that the delay is accurately controlled and is continuous. Since the entire process is digital, degradation of the delayed analog signal is minimal.

9 Claims, 5 Drawing Sheets

DIGITAL FINE DELAY PROCESSING

BACKGROUND OF THE INVENTION

The present invention relates to signal generation, and more particularly to a method of digital fine delay processing to produce a delayed analog signal from a digital signal representative of an undelayed analog signal with greater than one clock cycle resolution.

Digital technology has been developing, and information that used to be stored in analog form is now stored in digital form. However, eventually the digital data is converted into an analog signal when it is displayed, for example. An electronic circuit sometimes requires delaying an analog signal. It is easy to provide a delay equal to an integer multiple of a clock cycle, but often higher resolution is required.

FIG. 1 shows a conventional delay circuit for providing a high-resolution delay to an analog signal produced from digital data to produce a delayed analog signal. A data generator 10, which may be a storage unit such as a hard disk drive or a receiver for terrestrial digital broadcasting, provides N-bit digital data at a rate determined by a reference clock CLK. The N-bit digital data is converted into an analog signal by a digital-to-analog converter (DAC) 12 using the reference clock CLK. An analog delay line 14 delays the analog signal from the DAC 12 according to a delay control signal that determines in a continuous manner the amount of delay inserted by the analog delay line. This approach provides a delay having a resolution greater than one cycle of the reference clock CLK. The delay in the circuit shown in FIG. 1 does not always have a linear relationship to the delay control signal, so it is difficult to precisely control the delay amount. The analog signal is itself delayed, which degrades the delayed analog signal quality. Also a typical analog delay line 14 generates such heat that it is not suitable as part of an integrated circuit.

FIG. 2 shows another conventional delay circuit that controls the delay of the analog signal by delaying the reference clock CLK that is provided to the digital-to-analog converter (DAC) 12. The analog delay circuit 16 delays the reference clock CLK to provide a delayed clock DCLK that is provided to the DAC 12 to convert the N-bit digital data into the delayed analog signal. The delay of the reference clock CLK in the analog delay circuit 16 also is controlled by the delay control signal similar to the example of FIG. 1.

As shown in FIG. 3, analog signal 30 is the output signal from the DAC 12 when there is no delay in the delayed clock DCLK relative to the reference clock CLK, and analog signal 32 is a delayed version of analog signal 30 when there is a delay of Δt in the delayed clock DCLK. Sample points in the analog signals 30 and 32 represent the sample values of the corresponding digital data. The delay Δt of the delayed clock DCLK provided to the DAC 12 relative to the reference clock CLK is equivalent to the delays of the sample points of the digital data for the analog signal 30 being shifted horizontally in the delayed analog signal 32. Thus the delay Δt is smaller than the cycle of the reference clock CLK.

The circuit shown in FIG. 2 has the same problems due to the analog delay circuit 16 as that of FIG. 1. The reference clock for the digital data and the delayed clock for the DAC 12 are different so that a timing margin may become critical in the digital-to-analog conversion process of the DAC 12 if the delay Δt is too large. To avoid this situation, delay lines may be inserted into the respective N-bit data lines, which requires that the number of the delay lines equals the number of bits—N. As described above, an analog delay line has many issues. Other issues include sensitivity to temperature variation or tolerance variability of parts so that it is difficult to obtain a stable characteristic.

Since it is difficult for the analog delay circuit 16 to control the delay accurately, a digital delay line may be used for accurate delay control of an analog signal. For example, U.S. Pat. No. 6,218,880 (Relph) discloses technology that converts an analog input signal into parallel digital data with each bit being delayed by a separate digital delay line, and then reconverts the outputs from the multiple digital delay lines into an analog signal to provide a desired delay for the analog input signal. The delay of the Relph circuit, however, provides only delays that are integer multiples of the cycle of the clock, i.e., does not provide a continuous delay that is smaller than the clock cycle.

What is desired is a method of generating a continuous delay over a range of less than one clock cycle to provide a high resolution delay for an analog signal produced from digital data.

BRIEF SUMMARY OF THE INVENTION

Accordingly the present invention provides digital processing that generates processed digital data corresponding to a delayed analog signal that has a desired delay relative to an analog signal corresponding to original or source digital data. If the processed digital data is converted into an analog signal according to a reference clock, it provides a delayed analog signal with respect to an analog signal represented by the source digital data. The processed digital data is obtained according to a k-time frequency of the reference clock by digitally processing the source digital data. In this case, the processed digital data is converted into an analog signal according to a clock having a frequency k-times that of the reference clock to get the delayed analog signal. If k is larger than 1, the delayed analog signal is smoother, and if k is smaller than 1, it reduces data amount and processing load. The digital-to-analog conversion also uses the k-times frequency clock. All processes are done digitally in deriving the processed digital data from the source digital data. The digital processing may be done by a microprocessor if a slow process is acceptable, or by a DSP (Digital Signal Processor) or an FPGA (Field Programmable Gate Array) if a fast process is required. Accurate delay control is achieved because all the delay inducing process is digital, and the delay has a higher resolution than one clock cycle by changing a window function or coefficients used in the digital processing. The digital processing to produce the processed digital data may use convolution with the window function that is shifted by a difference depending on a desired delay. The result is that degradation of the analog delayed signal is at a minimum and there is an enough timing margin between the processed digital data and the clock during the digital-to-analog conversion because the conversion uses the same reference clock as the source digital data or a synchronized clock having a frequency k-times as high as that of the reference clock.

The objects, advantages and other novel features of the present invention are apparent from the following detailed description when read in conjunction with the appended claims and attached drawing.

DETAILED DESCRIPTION OF THE INVENTION

Figure 4:
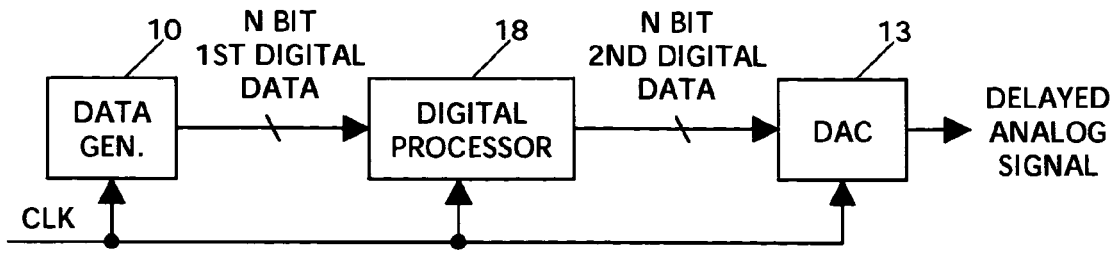
FIG. 4 is a block diagram view of a delay circuit using digital fine delay processing according to the present invention.

FIG. 4 shows a block diagram of a preferred embodiment according to the present invention. The delay circuit has well-known control means including microprocessor, hard disc drive, keyboard, etc., although they are not shown. The hard disc drive may store a program for control of the delay circuit.

Referring now to FIG. 4, a source data generator 10 provides N-bit digital data corresponding to an analog signal, where N is an integer number. The data generator 10 may be a storage unit, such as hard disc drive, flash memory, etc., or a receiver for terrestrial digital broadcasting. A digital processor 18 receives the source digital data for digital fine delay processing using a convolution function. The digital processor 18 may be a microprocessor, for example, or, if a faster processing is required, a DSP (Digital Signal Processor), FPGA (Field Programmable Gate Array), etc. The digital processor 18 changes a series of coefficients used in the convolution function depending on a desired delay input by a user through a keyboard (not shown). For convenience of explanation the digital data input to and output from of the digital processor 18 are called source and processed digital data, respectively, and the digital data are parallel N-bits, as shown. The digital data, however, may be in serial format during transfer while being in parallel format during processing. A digital-to-analog converter (DAC) 13 converts the processed digital data from the digital processor 18 into a delayed analog signal. The delayed analog signal has a delay relative to an analog signal that corresponds to the source digital data.

Figure 1:
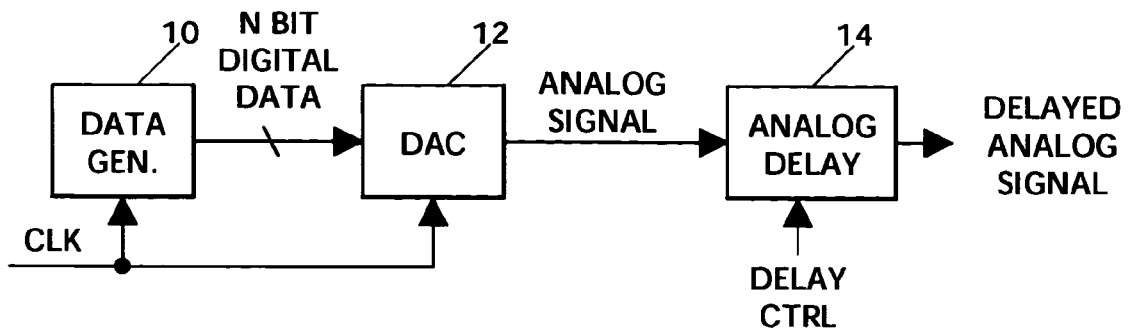
FIG. 1 is a block diagram view of a delay circuit for providing a delayed analog signal from digital data according to the prior art.
Figure 2:
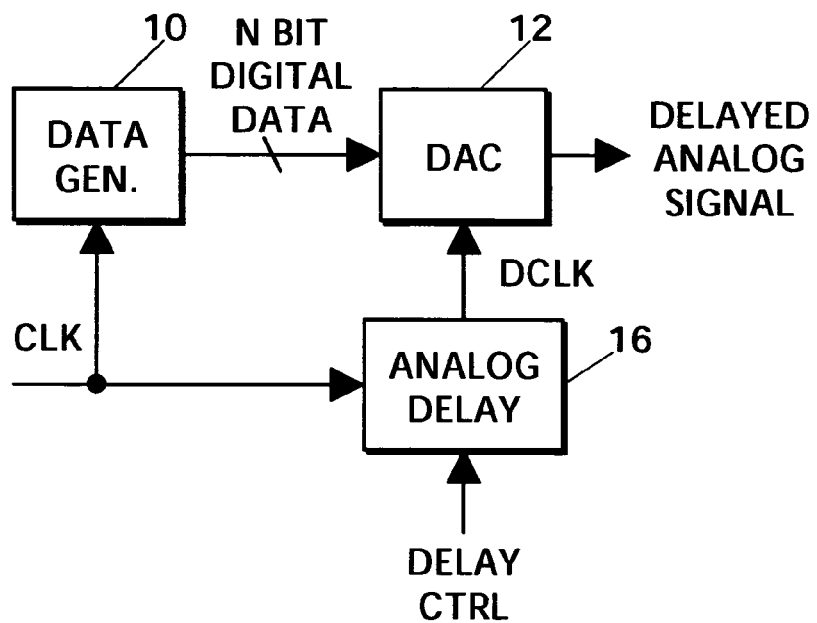
FIG. 2 is a block diagram view of another delay circuit for providing a delayed analog signal from digital data according to the prior art.
Figure 3:
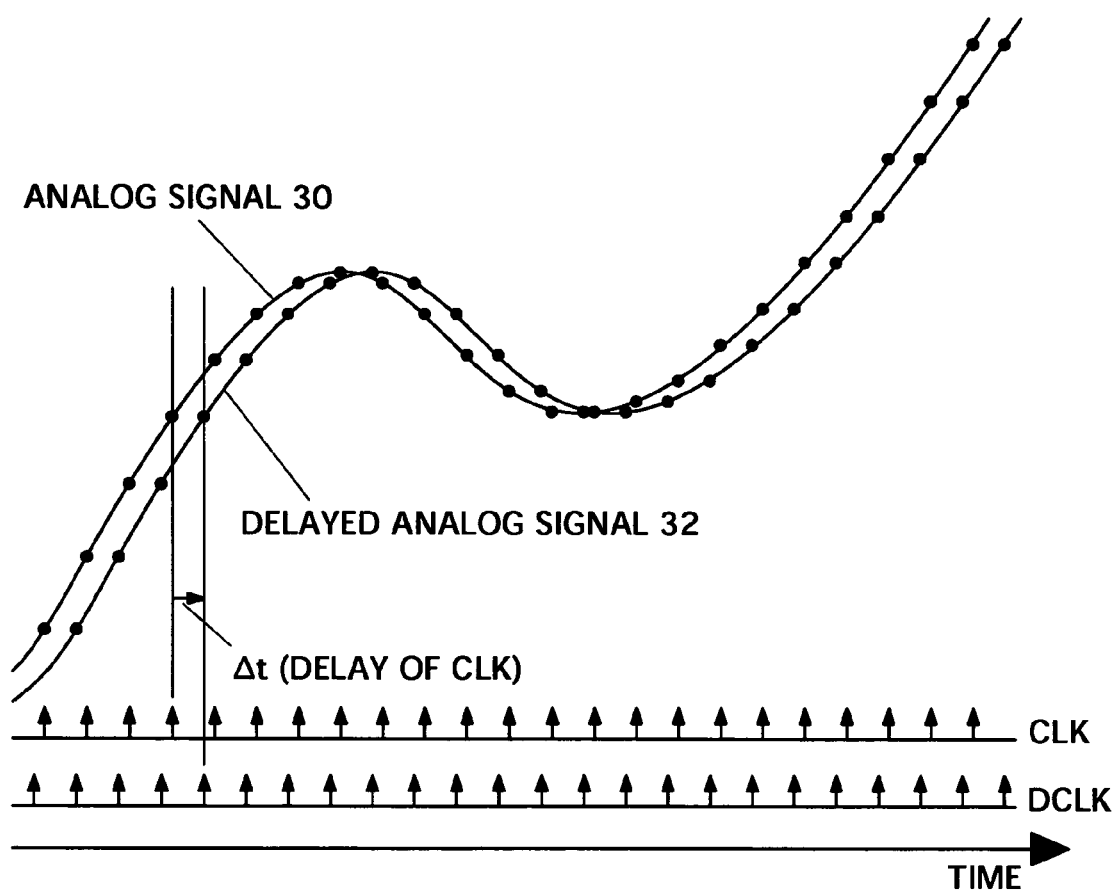
FIG. 3 is a graphic waveform view of an analog signal and a delayed analog signal corresponding to FIGS. 1 and 2.
Figure 5:
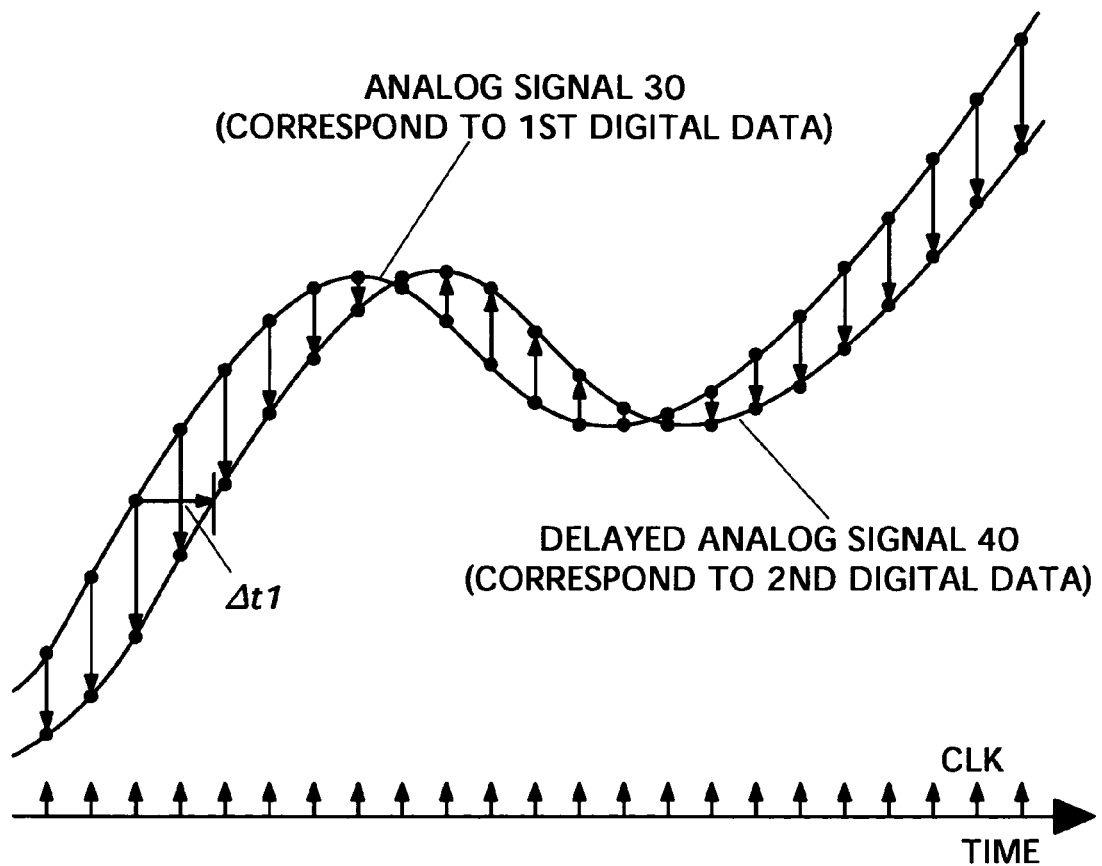
FIG. 5 is a graphic waveform view for the delay circuit of FIG. 4 according to the present invention.

In FIG. 5 a delayed analog signal 40 corresponding to the processed digital data has a delay of $\Delta t1$ relative to an analog signal 30 corresponding to the source digital data. Sample points on the analog signal 30 and delayed analog signal 40 are sample values of the source and processed digital data, and each sample point has an N-bit value. The analog signal 30 is a calculated waveform, and it is not necessary to generate the actual analog signal. Note that the sample values, or the sample points, on both analog signals are created at the same time. This means that the source and processed digital data are processed by the same clock, i.e., the processed digital data is calculated to have the same cycle and phase as the source digital data. This relationship never changes, even if the delay amount is changed, which is very different from just delaying the source digital data itself, i.e., the processed digital data is not just a delayed version of the source digital data as distinguished from the conventional data delay shown in FIG. 2 and in the above-mentioned U.S. Pat. No. 6,218, 880. Therefore, a phase difference between the clocks for the DAC 13 and the processed digital data provided to the DAC in principle is not required, and there is enough timing margin between the processed digital data and the clock during the digital-to-analog conversion.

Figure 6:
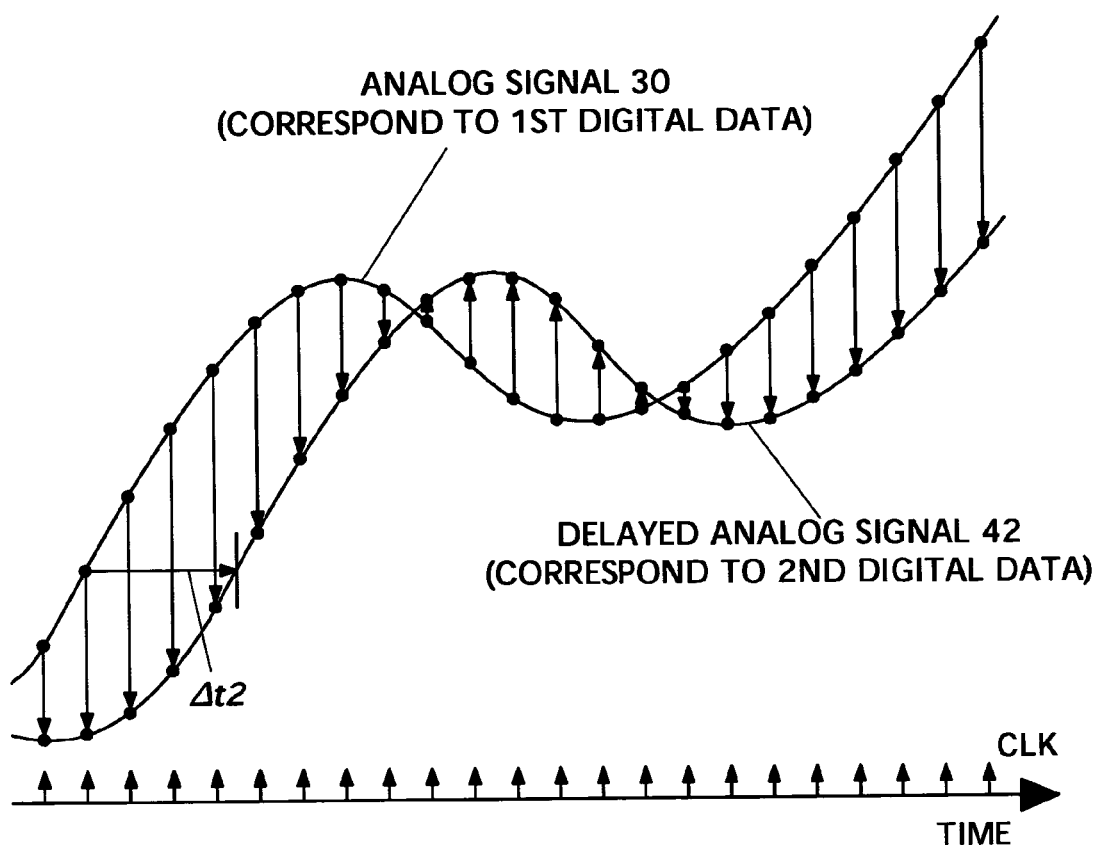
FIG. 6 is another graphic waveform view for the delay circuit of FIG. 4 according to the present invention.

FIG. 6 shows that a delay different from that of FIG. 5, i.e., delay $\Delta t2$ much larger than $\Delta t1$, may be achieved by changing the coefficients used in the convolution function. Regardless of the delay amount, the phase relationship between sample values of the source and processed digital data does not change. Therefore the source and processed digital data may be processed by the same clock in principle regardless of the desired delay amount.

In the convolution calculation the following equations show how to shift a delay $\Delta t$ for time t of the source digital data F1 (t) to obtain the processed digital data F2 (t) by using a window function W (t).

If convolution $F1(t)*W(0)=F1(t)$, then convolution
$F1(t)*W(\Delta t)=F1(t*\Delta t)=F2(t)$ where the window function W (t) is a series of coefficients.

Figure 7:
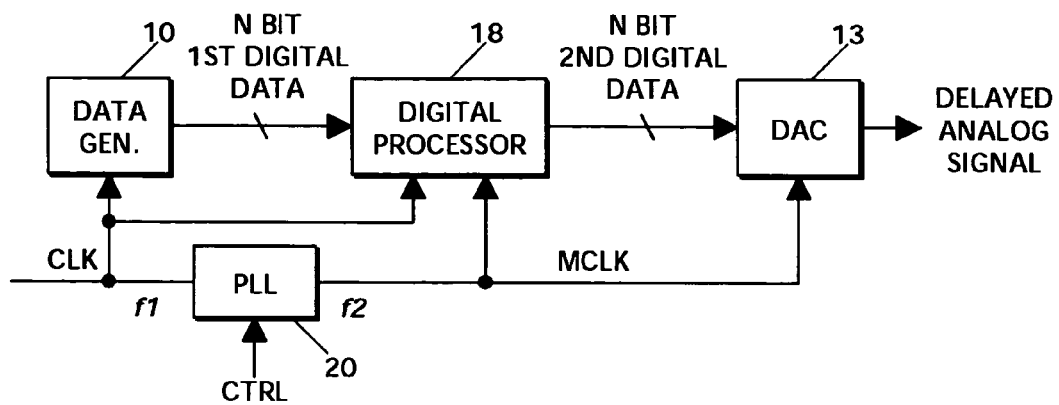
FIG. 7 is a block diagram view of another delay circuit using digital fine delay processing according to the present invention.

Referring to FIG. 7 in the delay circuit the source and processed digital data have a different number of samples for the same time interval. Comparing to FIG. 4 the delay circuit further has a phase locked loop (PLL) circuit 20 that generates a modified clock MCLK that is synchronized with the reference clock CLK for the source digital data, but has a different frequency. The frequency f2 of the modified clock MCLK may be higher or lower than the frequency f1 of the reference clock CLK. For example, if the number of samples for the processed digital data from the digital processor 18 is set to be twice as many the source digital data, the frequency f2 of the modified clock MCLK is also set to be twice as high as the frequency f1 of the reference clock CLK. If the number of samples for the processed digital data is less than for the source digital data, the respective frequencies are set according to the ratio of their data sample numbers. In general, if the number of samples for the processed digital data is k-times as many as for the source digital data, the frequency f2 of the modified clock MCLK is also set to be k-times the frequency f1 of the reference clock CLK. The multiplier k may be any rational number, such as ½, ⅔, 50/58, etc. as well as an integer, but not an irrational number like $\pi=3.141592\ldots$ This calculation makes the number of data samples for the processed digital data different that for the source digital data, and is achieved by a well-known process in the convolution function. If the frequency f2 of the modified clock MCLK is lower than frequency f1 of the reference clock CLK, then the digital processor may have a FIFO buffer clocked by CLK, as shown in FIG. 7, to buffer the data from the data generator 10.

Figure 8:
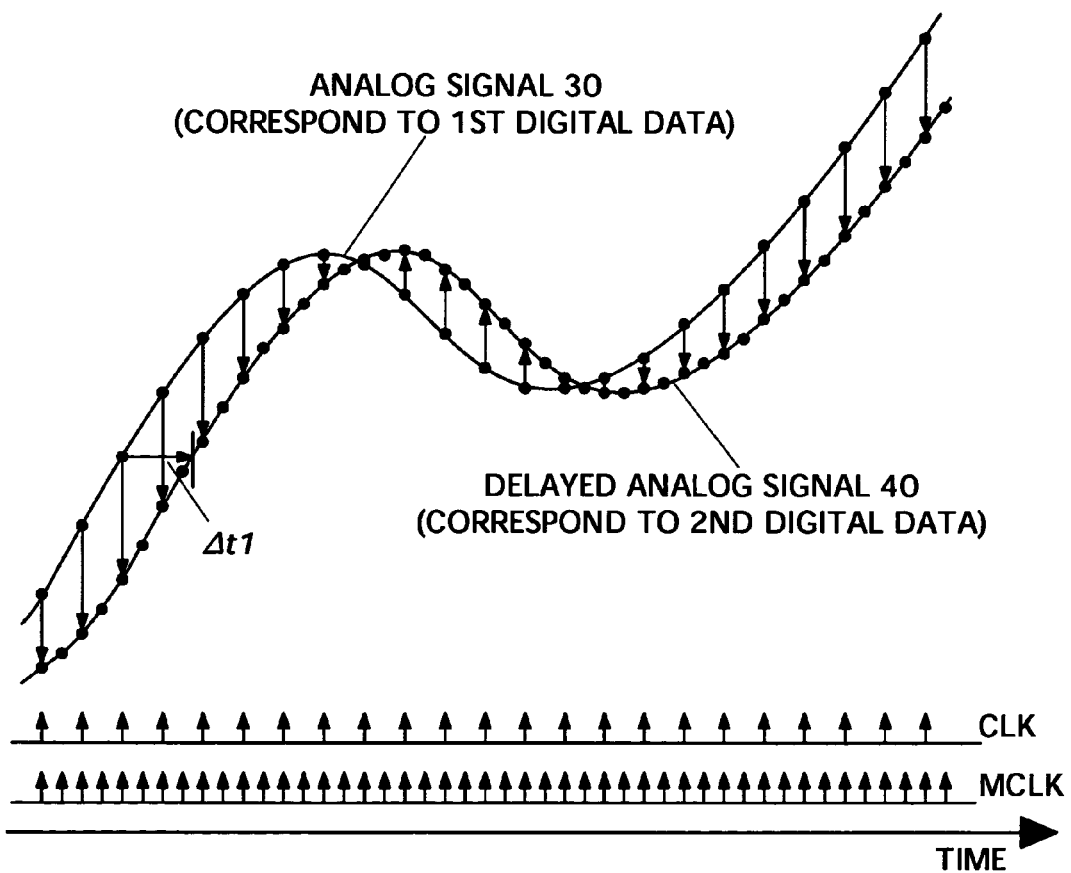
FIG. 8 is a graphic waveform view for the delay circuit of FIG. 7 according to the present invention.

FIG. 8 illustrates that the number of samples for the processed digital data is twice as many as for the source digital data although the delay is the same $\Delta t1$ as the example of FIG. 5, and that the frequency f2 of the modified clock MCLK is also twice the frequency f1 of the reference clock CLK. The data sample increase makes it possible to generate a smoother waveform for the delayed analog signal. The waveform is generated in the same manner even if the number of data samples for the processed digital data is less than that for the source digital data.

Thus the delay of the delayed analog signal is determined by a series of coefficients used in the convolution calculation that is done by the digital processor 18. Because the delay is determined fully by digital processing, it provides an accurate, controlled and continuous delay just by changing the coefficients. Therefore, the delay circuit has good linearity with respect to the delay control signal, is highly reproducible, has high resolution, and is suitable for use in integrated circuits. There is no analog processing during the delay process, so the delayed analog signal quality is good. Therefore the delay circuit is useful for generating a delayed analog signal from digital data, especially when it is required to control the output timing accurately and with high resolution. The degradation of the delayed analog signal is minimal, so it is also useful when the delayed analog signal has to be of high quality.

What is claimed is:

1. An apparatus for generating a delayed analog signal corresponding to processed digital data that has a user-controlled delay relative to an analog signal corresponding to source digital data, comprising:
   a first data generator for generating an n-bit stream of first the source digital data using a first clock;
   a clock processor structured to generate a modified clock from the first clock;
   a digital convolution processor having a data input for accepting the n-bit stream of the source digital data from the first data generator, having a first clock input for accepting the first clock, having a second clock input for accepting the modified clock, and the digital processor structured to generate, by a convolution function, a second n-bit stream of digital data at a frequency related to a ratio of the first clock and the modified clock; and
   a digital-to-analog converter accepting the second n-bit stream of second digital data and structured to generate the delayed analog signal from the second n-bit stream of second digital data that is related to the n-bit stream of first digital data.

2. The apparatus for generating a delayed analog signal corresponding to processed digital data that has a user-controlled delay relative to an analog signal corresponding to source digital data according to claim 1, in which the modified clock has twice the frequency of the first clock, and in which the second n-bit stream of second digital data is generated at twice the frequency of the n-bit stream first digital data.

3. The apparatus for generating a delayed analog signal corresponding to processed digital data that has a user-controlled delay relative to an analog signal corresponding to source digital data according to claim 2, wherein the processed digital data has the same cycle and phase as the source digital data.

4. The apparatus for generating a delayed analog signal corresponding to processed digital data that has a user-controlled delay relative to an analog signal corresponding to source digital data according to claim 1, wherein the digital convolution processor is structured to generate a continuous shift in delay time between the source digital data and the processed digital data using a window function.

5. The apparatus for generating a delayed analog signal corresponding to processed digital data that has a user-controlled delay relative to an analog signal corresponding to source digital data according to claim 4, wherein the shift in delay time is greater than one clock-cycle resolution.

6. An apparatus for generating a delayed analog signal corresponding to processed digital data that has a user-controlled delay relative to an analog signal corresponding to source digital data, comprising:
   a data generator for generating an n-bit stream of the source digital data using a clock signal;
   a digital convolution processor having a data input for accepting the n-bit stream of the source digital data from the data generator, having a clock input for accepting the clock signal, and the digital convolution processor structured to generate, by a convolution function, a second n-bit stream of digital data; and
   a digital-to-analog converter accepting the second n-bit stream of second digital data and structured to generate the delayed analog signal from the second n-bit stream of second digital data that is related to the n-bit stream of first digital data.

7. An apparatus for generating a delayed analog signal corresponding to processed digital data that has a user-controlled delay relative to an analog signal corresponding to source digital data according to claim 6, wherein the processed digital data has the same cycle and phase as the source digital data.

8. An apparatus for generating a delayed analog signal corresponding to processed digital data that has a user-controlled delay relative to an analog signal corresponding to source digital data according to claim 6, wherein the digital convolution processor is structured to generate a continuous shift in delay time between the source digital data and the processed digital data using a window function.

9. The apparatus for generating a delayed analog signal corresponding to processed digital data that has a user-controlled delay relative to an analog signal corresponding to source digital data according to claim 8, wherein the shift in delay time is greater than one clock-cycle resolution.

* * * * *

UNITED STATES PATENT AND TRADEMARK OFFICE
CERTIFICATE OF CORRECTION

| | | |
|---|---|---|
| PATENT NO. | : 8,713,083 B2 | Page 1 of 1 |
| APPLICATION NO. | : 11/036461 | |
| DATED | : April 29, 2014 | |
| INVENTOR(S) | : Kitagawa | |

It is certified that error appears in the above-identified patent and that said Letters Patent is hereby corrected as shown below:

Claims

Claim 1, column 5, line 13, delete "stream of first", and insert --stream of--.

Signed and Sealed this
Sixteenth Day of February, 2016

Michelle K. Lee
*Director of the United States Patent and Trademark Office*